Patented May 29, 1934

1,960,250

UNITED STATES PATENT OFFICE 1,960,250

COATING COMPOSITION

John Mano, Flushing, N. Y., assignor to Hosnoler Corporation, New York, N. Y., a corporation of New York No Drawing. Application January 6, 1930, Serial No. 418,992

7 Claims. (Cl. 134—17)

This invention relates to anti-corrosive and anti-fouling coating compositions and contemplates the provision of a durable varnish, paint and the like, resistant to friction, and of a base for such varnishes and paints which prevents the undesirable adhesion thereto of marine life, and preserves the surface to which it is applied against corrosion, and which may be applied to wet surfaces.

In carrying out my invention, I prefer to use any one of a great variety of substances of the same general nature which I will call "lactiferous plant exudates", whether in coagulated form, or in the form of latex, in combination with resinous substances or substances capable of oxidation into resinous substances, together with a comparatively small percentage of a suitable toxic, and added cholesterin either in the form of an animal fat rich in cholesterin, or else carried by an oily, waxy or fatty vehicle, whether a natural vehicle for the cholesterin or not.

The substances which I include under the general term "lactiferous plant exudates" are substances in the general nature of rubber or its congeners and may be derived from a great variety of plants such as trees, shrubs and vines found or grown principally in tropical regions. The plants from which such exudates are obtainable are very large in number, many having been classified but many being still commercially and botanically unknown. All of said plants, however, yield a colloid usually, though not accurately, designated by the general term "rubber", but I prefer to use the term "lactiferous plant exudate" in order to include substances which may not be true rubber, but which function in my improved composition with equal effect to impart good adhesion, elasticity, and other properties thereto.

Such exudates include gutta percha, caoutchouc, balata, guayule, euphorbia and any of their congeners. They possess the common properties when treated in a manner which is well known, of having considerable elasticity, adhesion, and resiliency, as well as being water-repellant. I include such an exudate in my new composition to enable it to yield sufficiently under stress to resist the wearing action and friction of sea water under motion. The property of elasticity and yielding under action which would quickly destroy other paints may be aided by the other ingredients, as will be pointed out hereinafter, so that my composition is not removed by the friction of the water, as when it breaks against walls, piers, piling, under-sea machinery or construction and the like, coated thereby, nor is my improved paint likely to be rubbed or washed off for long periods when used on ship bottoms, buoys, and seaplane pontoons.

My improved composition can also be painted directly on moist or water-wet surfaces such as moist refrigerator walls, ship bottoms, under-sea construction and the like without the necessity for first drying the surface as is necessary with paints heretofore known. It therefore becomes unnecessary to shut down such plants for painting, thereby resulting in material savings. When painted on such moist surfaces, my improved composition adheres firmly and permanently. I have also found that it prevents excessive condensation of moisture as when used, for example, on the inner walls of refrigerators or cold storage plants. By the use of the proper solvents, as hereinafter pointed out, my composition is particularly useful in food plants, since it is substantially odorless, and there are no odors to be absorbed by the foods.

In addition to or in place of the exudates mentioned, I prefer to use a base. By this term, I mean any type of resin such as is suitable for use in varnish and paint bases, whether a true resin, an oil resin, or a drying oil which, when oxidized, acts substantially in the same manner as a resin. For example, I may use any of the resins obtained from living trees such as colophony, sandarac, dammars, mastic, or the like, or the so-called hard resins such as fossil resins, copal resins or varnish gums, or synthetic resins such as phenolic resins, or coal tar resins such as courmarone or indene resins, or even certain other varnish or paint bases in the form of vegetable drying oils such as China-wood oil, linseed oil and the like, whether oxidized or not, or the resins extracted from various plant exudates, including rubber resins.

The resin or other substance which I have termed the base, is preferably used for the purpose of giving body to the composition and for the purpose of aiding in hardening the composition after it has been applied to the surface to be protected, as well as for the purpose of aiding in binding the ingredients together.

For aiding to impart elasticity to my new composition and to further impart its peculiar water-absorbent and water-repellant properties thereto, so that my composition may be used in damp or wet places, or where exposed to the action of sea water, I prefer to use about one part of cholesterin to two parts each of the base and the exudate.

I have found that cholesterin added to resin in the proper proportions, by dissolving both in a suitable solvent and then evaporating the solvent, or by fusion, and when carried by a suitable fatty, waxy or oily vehicle, makes a compound which is stringy, tacky and elastic. The combination is well fitted for use in my new composition. The cholesterin, as I believe, imparts to the composition the property of indefinitely resisting oxidation, thereby acting as a preservative. It prevents the composition from drying out too hard, thereby retaining its elasticity indefinitely. It absorbs a definite percentage of water, which it distributes on sub-division throughout the composition, and after absorbing its water content, then repels moisture. The cholesterin keeps the composition sufficiently moist to prevent loss of elasticity and prevents the composition from becoming brittle. It aids in holding added pigments in emulsion, and assists in the emulsification of the vehicle for the cholesterin with the moisture content of the composition. It also permits of the addition of water if necessary, especially if water soluble toxics are to be used.

Any animal, vegetable or mineral fat, oil or wax in which cholesterin is soluble, may be used as the vehicle for the cholesterin, as well as blown oils, sulphonated oils and hydrogenated oils. The vehicle I will term a "fatty" substance. The cholesterin may be added to the fatty substance, or may be introduced into the composition in the natural form of an animal fat rich in cholesterin. In any case, I have found that the cholesterin serves as an emulsifying agent not only for the fatty substance, but also for the pigments which may be added to give body and color to the composition, or as a vehicle for the cholesterin. The emulsification is carried out quite well even in the presence of water, since I believe that the cholesterin after absorbing its limit of moisture, then repels water.

For the use of my composition as an anti-fouling paint, I prefer to add a small percentage of a toxic. The toxic may be any such as have been heretofore known in anti-fouling paints. I prefer, however, to use such toxics as are water soluble, for the reason that the emulsion formed by the cholesterin vehicle and water absorbed by the composition becomes more readily impregnated with the toxic, and is absorbed by the marine life which attempts to adhere to the surface coated with my composition. The composition being somewhat yieldable and elastic, the toxic is not permanently bound therein, but is available at the surface at all times for absorption by marine life. As examples of suitable toxics, I may mention metallic toxics such as mercury, copper and arsenic compounds, cyanide compounds, poisonous alkaloids, emodin-bearing drugs, quinine or quinine-bearing drugs, bitter substances such as aloes, picrotoxin, cantharides, aspidium and the like. I have found that as little as one tenth of one percent by weight of the toxic is often sufficient to prevent undesirable adhesion for long periods, of marine life to a surface coated with my composition and exposed to such life.

I attribute this to the peculiarly efficient distribution of the toxic throughout the composition and its peculiar availability at the surface thereof at all times for imbibing or suction by such life.

In addition to some or all of the above mentioned ingredients, I may add suitable pigments such as are well known and therefore need not be set forth in detail, for the purposes mentioned above, said pigments emulsifying with the remaining ingredients without difficulty, due largely to the presence of the cholesterin.

It is desirable that whatever ingredients are used be intimately mixed to obtain a homogeneous composition. This I may do by dissolving the resin or varnish base, exudate, cholesterin, and its vehicle in suitable solvents, mixing and adding the toxic. I obtain a better mixture by then evaporating the solvents and if desired, powdering the residue and again dissolving in a suitable solvent. Or the ingredients may be carefully fused together and then thinned by the solvent. Or again, the fused material may be powdered and then dissolved.

I prefer to use carbon tetrachloride as the solvent, since this substance produces a non-inflammable composition, but to lessen the cost, I may omit this substance altogether or use it in connection with a great variety of other solvents such as carbon disulphide, chloroform, benzol and its homologues, illuminating gas, drip oil, aliphatic hydrocarbons and their derivatives, and aromatic hydrocarbons and their derivatives. Such solvents, when used as vehicles for the cholesterin, also assist in the emulsification of the composition.

It will be understood that while I have described certain specific embodiments of my invention, I do not wish to be understood as limiting myself thereto, since part or all of the ingredients may be used, other equivalent ingredients may be substituted and the proportions mentioned widely varied, and that I intend to claim my invention as broadly as may be permitted by the state of the prior art and the terms of the appended claims.

I claim:

1. An anti-corrosive coating composition drying comparatively soft and elastic, and applicable to water-wet surfaces, including two parts of a lactiferous plant exudate two parts of a resin, one part of cholesterin, and a pigment, the pigment emulsifying with the remaining ingredients in the presence of the cholesterin.

2. An anti-corrosive and anti-fouling coating composition, including two parts of a lactiferous plant exudate, one part of cholesterin, two parts of a resinous base, and a toxic.

3. The method of making an anti-fouling coating composition consisting of dissolving cholesterin, resin, and a coagulated lactiferous plant exudate in suitable solvents, evaporating the solvents, powdering the residue, dissolving the residue in a suitable solvent, and adding a toxic.

4. The method of making an anti-fouling coating composition consisting of dissolving resin, a lactiferous plant exudate, cholesterin and a vehicle for the cholesterin in suitable solvents, mixing the dissolved ingredients, evaporating the solvents, powdering the residue, and incorporating a toxic.

5. The method of making an anti-fouling coating composition consisting of fusing together a resin, a lactiferous plant exudate, cholesterin, and a vehicle for the cholesterin, thinning the fused mass with a solvent and adding a toxic.

6. The method of making an anti-fouling coating composition consisting of fusing together cholesterin, a lactiferous plant exudate, and a resinous base, powdering the fused mass, dissolving the powdered material with a solvent, and adding a toxic.

7. An anti-corrosive and anti-fouling coating composition adapted to remain soft and elastic for an indefinite period, which does not dry hard and adapted to retain moisture therein for imbibition by marine life comprising one part of cholesterin, an animal fat rich in and serving as a vehicle for the cholesterin, two parts of a lactiferous plant exudate in the nature of rubber, two parts of a resin, about one-tenth of 1% of a water soluble toxic distributed throughout the composition and held therein by the moisture content thereof by the action of the cholesterin, but not permanently bound therein, a pigment and a solvent, all of the ingredients being intimately mixed.

JOHN MANO.